United States Patent
Grimsley (10) Patent No.: US 10,870,382 B2
(45) Date of Patent: Dec. 22, 2020

(54) TECHNOLOGIES FOR LOADING, TRANSPORTING, AND UNLOADING OF LOADS

(71) Applicant: DURA-LINE CORPORATION, Knoxville, TN (US)

(72) Inventor: Timothy A. Grimsley, Knoxville, TN (US)

(73) Assignee: Dura-Line Corporation, Knoxville, TN (US)

( * ) Notice: Subject to any disclaimer, the term of this patent is extended or adjusted under 35 U.S.C. 154(b) by 239 days.

(21) Appl. No.: 15/862,846

(22) Filed: Jan. 5, 2018

(65) Prior Publication Data

US 2018/0194262 A1 Jul. 12, 2018

Related U.S. Application Data

(60) Provisional application No. 62/444,426, filed on Jan. 10, 2017.

(51) Int. Cl.
*B60P 3/035* (2006.01)

(52) U.S. Cl.
CPC .................................. *B60P 3/035* (2013.01)

(58) Field of Classification Search
CPC .. B60P 3/035; B60P 3/07; B60P 3/122; B65H 49/321; B65H 49/325; B65H 49/327; B65H 49/36; B65H 49/38; B60R 9/06; B60R 9/10; B60R 9/0485; B60R 9/0423; A61G 3/0209
USPC ....... 414/468; 224/502, 519, 532; 242/533.8
See application file for complete search history.

(56) References Cited

U.S. PATENT DOCUMENTS

| | | | |
|---|---|---|---|
| 1,864,676 A | 6/1932 | Smith | |
| 2,759,682 A | 8/1956 | Garnett | |
| 2,793,773 A | 5/1957 | Boliac | |
| 2,867,390 A | 1/1959 | Anrig | |
| 3,000,587 A | 9/1961 | Goode | |
| 3,379,392 A | 4/1968 | Garnett | |
| 3,690,491 A | 9/1972 | Butler, Jr. | |
| 3,734,540 A | 5/1973 | Thiermann | |
| 3,860,193 A | 1/1975 | Green | |
| 3,990,650 A | 11/1976 | Devine | |
| 4,194,702 A | 3/1980 | Ploeg | |
| 4,400,129 A * | 8/1983 | Eisenberg | A61G 3/0209 224/505 |
| 4,701,098 A | 10/1987 | Bills et al. | |
| 4,762,291 A | 8/1988 | Sauber | |
| 5,190,195 A * | 3/1993 | Fullhart | B60R 9/10 224/497 |
| 5,225,809 A | 7/1993 | Bunn | |
| 5,330,084 A * | 7/1994 | Peters | B60R 9/06 211/171 |

(Continued)

FOREIGN PATENT DOCUMENTS

DE      102006036720      2/2008

OTHER PUBLICATIONS

Canada Examiner's Report dated Aug. 10, 2018 in related application CA2,990,938 filed Jan. 5, 2018 (3 pages).

(Continued)

*Primary Examiner* — Glenn F Myers
(74) *Attorney, Agent, or Firm* — Dentons US LLP (57) ABSTRACT

This disclosure discloses various technologies for loading, transporting, and unloading of loads, such as reels, cylinders, containers, and others.

51 Claims, 6 Drawing Sheets

(56) References Cited

U.S. PATENT DOCUMENTS

| | | | |
|---|---|---|---|
| 5,615,813 A * | 4/1997 | Ouellette | B60P 3/40 224/405 |
| 5,626,126 A | 5/1997 | McNulty | |
| 5,641,108 A | 6/1997 | Ewer | |
| 5,752,636 A * | 5/1998 | Manley | B60P 3/40 224/403 |
| 6,129,371 A * | 10/2000 | Powell | B60R 9/06 224/502 |
| 6,812,707 B2 | 11/2004 | Yonezawa et al. | |
| 7,530,523 B1 | 5/2009 | Murray | |
| 8,132,997 B2 * | 3/2012 | Reuille | B60P 1/4421 224/537 |
| 8,844,577 B2 | 1/2014 | Kiest, Jr. | |
| 2002/0121568 A1 | 9/2002 | Malmend | |
| 2003/0184048 A1 | 10/2003 | Bonde | |
| 2003/0231020 A1 | 12/2003 | Yonezawa et al. | |
| 2004/0065767 A1 | 4/2004 | Parker | |
| 2004/0211272 A1 | 10/2004 | Aronstam et al. | |
| 2004/0213655 A1 * | 10/2004 | Buckner | B60R 9/06 414/462 |
| 2005/0023315 A1 * | 2/2005 | Skinner | B60R 9/06 224/506 |
| 2007/0145088 A1 | 6/2007 | Depot | |
| 2007/0158379 A1 * | 7/2007 | Bell | B60R 9/0485 224/504 |
| 2008/0085176 A1 | 4/2008 | Statkus | |
| 2009/0196723 A1 | 8/2009 | Smith et al. | |
| 2010/0090053 A1 | 4/2010 | Stiltner | |
| 2011/0024472 A1 * | 2/2011 | Thompson | B60R 9/042 224/500 |
| 2011/0025468 A1 | 2/2011 | Longhurst et al. | |
| 2011/0116902 A1 | 5/2011 | Smith et al. | |
| 2013/0092387 A1 | 4/2013 | Radi | |
| 2013/0264367 A1 * | 10/2013 | Hill | B60R 9/06 224/413 |
| 2014/0056674 A1 | 2/2014 | Smith et al. | |
| 2014/0291370 A1 * | 10/2014 | Donnigan | B60R 9/06 224/502 |
| 2015/0166297 A1 | 6/2015 | Smith et al. | |
| 2015/0291076 A1 | 10/2015 | Keast et al. | |
| 2016/0068110 A1 * | 3/2016 | Prescott | B60R 9/10 224/521 |
| 2016/0090266 A1 * | 3/2016 | Brinkerhoff | B65H 49/32 242/557 |
| 2016/0185303 A1 * | 6/2016 | Oxley | B60R 9/06 224/519 |
| 2016/0250976 A1 * | 9/2016 | Ammirati | B60R 9/0485 224/502 |
| 2018/0072237 A1 * | 3/2018 | Kuschmeader | B60R 9/10 |
| 2019/0351837 A1 * | 11/2019 | Murray | B60D 1/54 |

OTHER PUBLICATIONS

Brazil Office Action dated May 20, 2020 in related Application No. 102014000353-3 filed Jan. 7, 2014 (4 pages).

* cited by examiner

TECHNOLOGIES FOR LOADING, TRANSPORTING, AND UNLOADING OF LOADS

CROSS-REFERENCE TO RELATED APPLICATIONS

This application claims a benefit of U.S. Patent Application 62/444,426 filed on Jan. 10, 2017, which is herein incorporated by reference for all purposes.

TECHNICAL FIELD

This disclosure relates to various technologies for loading, transporting, and unloading of loads, such as reels, cylinders, containers, and others.

BACKGROUND

An industrial reel, whether full or empty, is bulky for loading, transporting, and unloading and can consume a number of pieces of equipment, trailers, trucks, and manpower.

SUMMARY

An embodiment includes a method comprising: accessing a frame including a first bar, a second bar, and a third bar, wherein the first bar is longitudinally cantilevered from a hitch, wherein the second bar is longitudinally cantilevered from the first bar such that the second bar is pivotable with respect to the first bar between a transport position and a loading position, wherein the third bar is transversely cantilevered from the second bar; mounting a reel onto the third bar as the second bar is in the loading position; pivoting the second bar from the loading position to the transport position; and locking the second bar in the transport position such that the second bar is unable to pivot from the transport position to the loading position.

An embodiment includes a method comprising: accessing a frame including a first bar, a second bar, and a third bar, wherein the first bar is longitudinally cantilevered from a hitch, wherein the second bar is longitudinally cantilevered from the first bar such that the second bar is pivotable with respect to the first bar between a transport position and a loading position, wherein the third bar is transversely cantilevered from the second bar, wherein the third bar hosts a reel mounted thereon as the second bar is in the transport position; unlocking the second bar in the transport position as the third bar hosts the reel such that the second bar is able to pivot from the transport position to the unloading position; pivoting the second bar from the transport position to the unloading position as the third bar hosts the reel; and removing the reel from the third bar as the second bar is in the unloading position.

This disclosure may be embodied in various forms illustrated in a set of accompanying illustrative drawings. Note that variations are contemplated as being a part of this disclosure, limited only by a scope of a set of claims recited below.

DESCRIPTION OF DRAWINGS

The set of accompanying illustrative drawings shows various example embodiments of this disclosure. Such drawings are not to be construed as necessarily limiting this disclosure. Like numbers or a similar numbering scheme can refer to like or similar elements throughout.

DETAILED DESCRIPTION

This disclosure is now described more fully with reference to the set of accompanying illustrative drawings, in which example embodiments of this disclosure are shown. This disclosure may, however, be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

Figure 1:
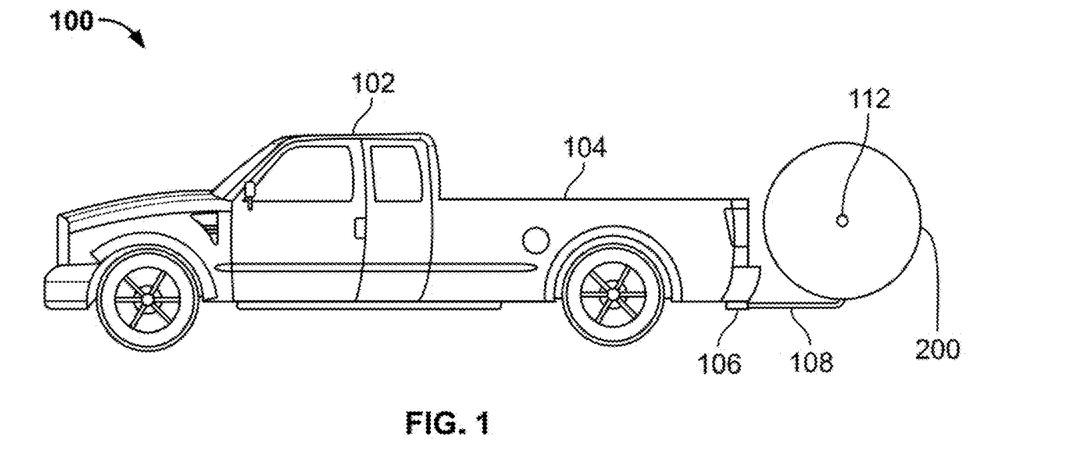
FIG. 1 shows a schematic profile view of an embodiment of a vehicle with a reel carrier in a transport mode hosting a reel according to this disclosure.
Figure 2:
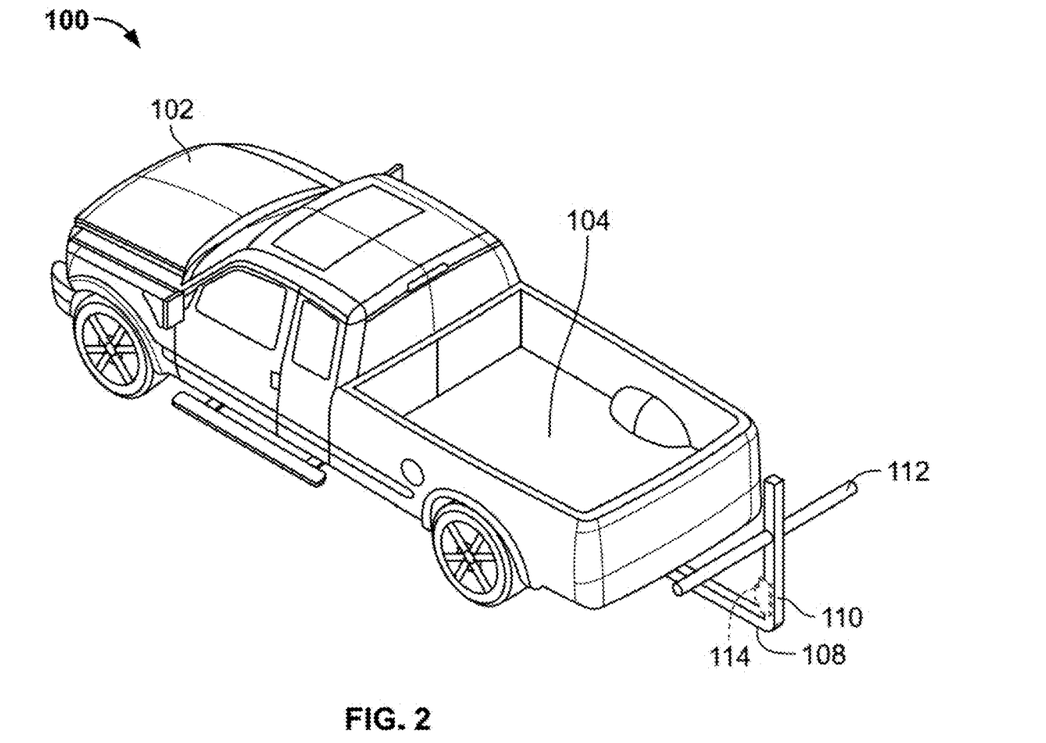
FIG. 2 shows a schematic perspective view of an embodiment of a vehicle with a reel carrier in a transport mode according to this disclosure.
Figure 3:
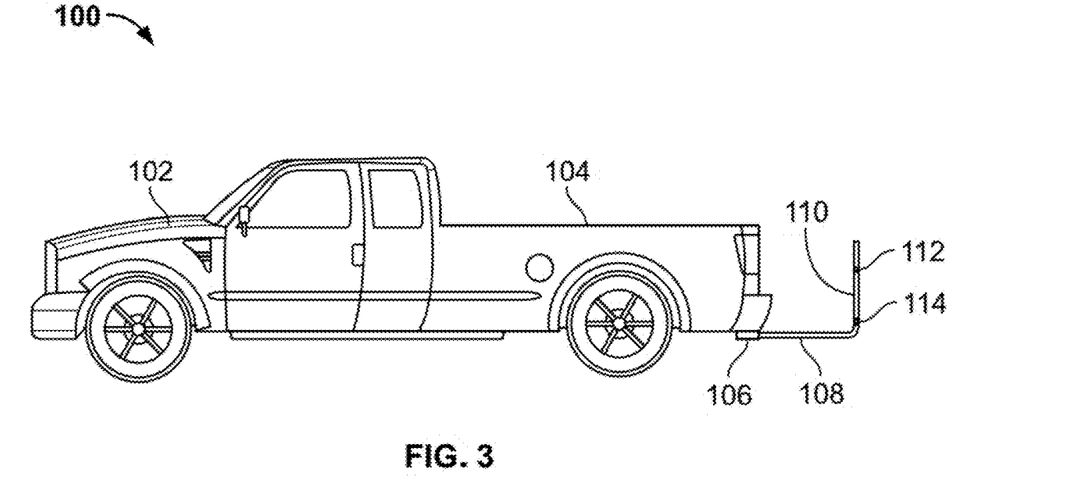
FIG. 3 shows a schematic profile view of an embodiment of a vehicle with a reel carrier in a transport mode according to this disclosure.
Figure 4:
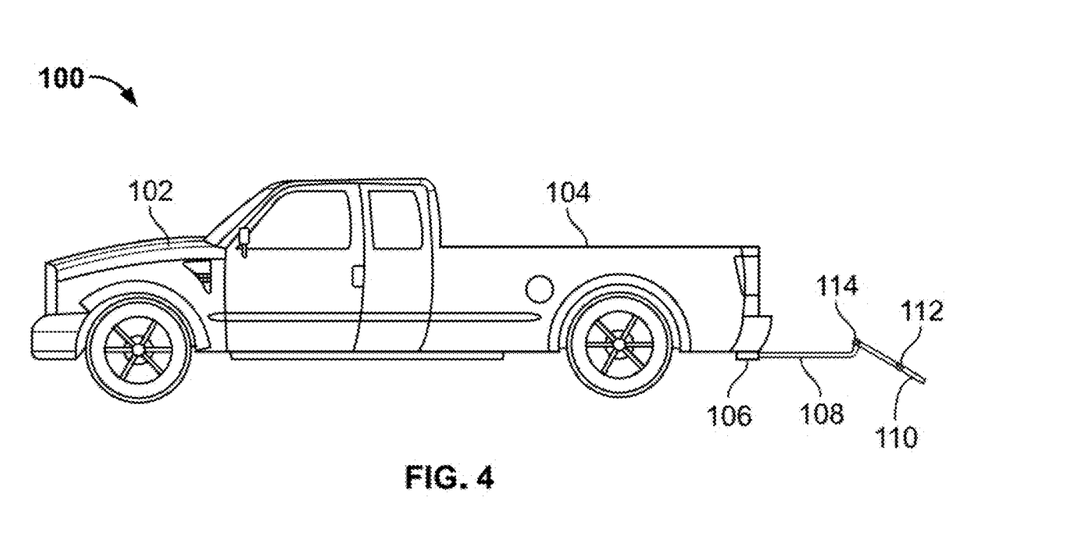
FIG. 4 shows a schematic profile view of an embodiment of a vehicle with a reel carrier in a loading or unloading mode according to this disclosure.

FIG. 1 shows a schematic profile view of an embodiment of a vehicle with a reel carrier in a transport mode hosting a reel according to this disclosure. FIG. 2 shows a schematic perspective view of an embodiment of a vehicle with a reel carrier in a transport mode according to this disclosure. FIG. 3 shows a schematic profile view of an embodiment of a vehicle with a reel carrier in a transport mode according to this disclosure. FIG. 4 shows a schematic profile view of an embodiment of a vehicle with a reel carrier in a loading or unloading mode according to this disclosure. In particular, a system 100 includes a pickup truck 102 having a cargo area 104 and a tow hitch 106. The pickup truck 102 stands at rest on a ground surface, whether smooth or rough, whether a horizontal or diagonal plane. Note that other vehicle types are possible, such as a sports utility vehicle (SUV), a van, a wagon, a locomotive, a rail car, a construction vehicle, or others.

The system 100 further includes a frame that includes a first bar 108, a second bar 110, and a third bar 112, with the third bar 112 hosting a reel 200 longitudinally mounted thereon. The first bar 108 and the second bar 110 are removably or permanently coupled to each other via a hinge 114. The reel 200 can receive, host, or be used to dispense or selectively deploy, such as via extending or retracting, a cable, a hose, a wire, a rope, a cord, a string, a duct, a conduit, or another elongated element, whether hollow, full, or solid, or the reel 200 can be empty. For example, the reel 200 can have a 35 or 42 inch diameter. However, note that other load types can be used, such as cylinders, containers, and others, whether additionally or alternatively, whether full or empty, whether rigid or flexible, whether solid or perforated.

The first bar 108 is removably secured to the tow hitch 106 at one end, such as via mating, fastening, or others, such that the first bar 108 is longitudinally cantilevered from the tow hitch 106. The first bar 108 is rigid and includes metal, plastic, or others. The first bar 108 is solid, but can be perforated. The first bar 108 is longitudinally rectilinear, but can be longitudinally sinusoidal or arcuate, whether peaking downward or upward or sideways. The first bar 108 also includes a hook end portion distal to the tow hitch 106, although a rectilinear end portion of the first bar 108 is possible as well. The hook end portion includes the hinge 114, such as via fastening, mating, or others.

The second bar 110 is longitudinally cantilevered from the hook end portion of the first bar 108, while being distal to the tow hitch 106, such that the second bar 110 is pivotable with respect to the first bar 108 via the hinge 114. The second bar 110 is rigid and includes metal, plastic, or others. The second bar 110 is solid, but can be perforated. The second bar 110 is longitudinally rectilinear, but can be longitudinally sinusoidal or arcuate, whether peaking downward or upward or sideways. The second bar 110 can pivot with respect to the first bar 108 between a transport position, such as an upright position shown in FIGS. 1-3, and a loading or unloading position, such as an inclined position shown in FIG. 4. As shown in FIG. 2, the first bar 108 and the second bar 110 form an L-shape in the transport position. However, note that the transport position and the loading or unloading position can be oriented differently with respect to the first bar 108 and the second bar 110. For example, the transport position of the second bar 110 can be oriented such that the reel 200 is raised above the ground surface, whether the second bar 110 is upright or inclined, whether with a positive, zero, or negative slope, whether away from or towards the pickup truck 102. Likewise, for example, the loading or unloading position of the second bar 110 can be oriented such that the reel 200 contacts or avoids contact with the ground surface on which the pickup truck 102 rests, whether the second bar 110 has a negative, zero, or positive slope. In some embodiments, the second bar 110 can rotate sideways (portside and starboard) via the hinge 114 with respect to the first bar 108.

The hinge 114 can be removably or permanently secured to the first bar 108 or the second bar 110 via mating, fastening, or others, whether in similar or dissimilar manners. For example, the hinge 114 can be detachable from the first bar 108 and the second bar 110. The hinge 114 can be configured to enable a free rotation or a biased rotation, whether away or towards the pickup truck 102 or sideways (portside and starboard). The hinge 114 can be configured for positional locking via at least one of a pin, a hook, a ratchet, a bolt, or others such that the second bar 110 is unable to pivot from the transport position to the loading position or vice versa, especially when the pickup truck 102 is moving, whether frontward or rearward. The hinge 114 can include metal, plastic, or others. As such, via the hinge 114, the second bar 110 has a range of pivoting motion at least between the transport position and the loading position, where the range of pivoting motion can be about 180 degrees or less, as shown in FIGS. 2-4.

Although the second bar 110 can be pivoted, whether away or towards the pickup truck 102 or sideways (portside and starboard), with respect to the first bar 108 via the hinge 114 through a manual application of force, in some embodiments, the second bar 110 can be pivoted, whether away or towards the pickup truck 102 or sideways (portside and starboard), with respect to the first bar 108 via the hinge 114 through an automated application of force. For example, the automated application of force can occur via a motor or actuator. The motor or actuator can be self-powered, such as via an on-board rechargeable battery, such as a lithium battery or others. The motor or actuator can be powered via a mains power source through a power cord attached thereto. The motor or actuator can be powered via a renewable energy source, such as via a photovoltaic array or a fluid turbine, whether gas or liquid, operably coupled thereto. The motor or actuator can be powered via the pickup truck 102, such as via a power cable coupled to or running into the pickup truck 102 through or along the first bar 108, such as via being coupled to or into an in-vehicle electric socket. At least one of the first bar 108 or the second bar 110 can host or support the motor or actuator, such as via fastening, mating, or others. Note that this disclosure is not limited to the motor or actuator and other technologies for providing the automated application of force can be used, such as a hydraulic system, a pneumatic system, a pulley system, or others.

The third bar 112 is transversely cantilevered from the second bar 110 such that the third bar 112 and the second bar 110 can form a T-shape when viewed from one side of the second bar 110. For example, as shown in FIG. 2, the second bar 110 and the third bar 112 form the T-shape. Likewise, as shown in FIG. 2, the third bar 112 is transversely cantilevered from the second bar 110 such that the third bar 112 and the second bar 110 form a plus sign or a cross, whether perpendicular or non-perpendicular, when viewed from both sides of the second bar 110, whether as a single bar or a plurality of bars, such as one bar per side. The third bar 112 is rigid and includes metal, plastic, or others. The third bar 112 is solid, but can be perforated. The third bar 112 is longitudinally rectilinear, but can be longitudinally sinusoidal or arcuate, whether peaking downward or upward or sideways. The third bar 112 is permanently or removably secured to the second bar 110 at one end, such as via mating, fastening, or others. For example, the third bar 112 can be detachable from the second bar 110, although a monolithic or unitary construction is possible. The third bar 112 can be longitudinally adjustable, such as via telescoping away or towards the second bar 110, whether in a manual or motorized manner, such as disclosed herein. The third bar 112 can be stationary or movable with respect to the second bar 110, such as via pivoting away or towards the pickup truck 102 or the first bar 108, such as via a hinge coupled to the second bar 110 and the third bar 112, which can be positionally lockable, as disclosed herein. The third bar 112 is sufficiently durable to support the reel 200 mounted thereon, whether full or empty. Note that the third bar 112 can longitudinally extend away from the second bar 110 past the reel 200, up to the reel 200, or less than the reel 200 when the reel 200 is mounted on the third bar 112. Further, note that more than one reel 200 can be mounted onto the third bar 112. Moreover, note that the third bar 112 can host an arm, whether rectilinear, sinusoidal or arcuate, at an end portion thereof, distal to the second bar 110, with the arm radially extending from the third bar 112 in a cantilevered and sunray manner such that the arm engages the reel 200 and prevents the reel 200 from sliding off the third bar 112, especially when the pickup truck 102 is moving, whether frontward or rearward. The arm can be fastened, mated, or otherwise removably or permanently secured or deployed with the third bar 112. The arm can retract or deploy into and out of the third bar 112, whether in a manual or automatic manner, as disclosed herein.

In one mode of operation, the reel 200 can be mounted onto the third bar 112 as the second bar 110 is in the loading position, such as shown in FIG. 4, and the pickup truck 102 is at rest on the ground surface. Note that the reel 200 can be in contact with the ground surface during such mounting. For example, the reel 200 can be rolled to the third bar 112 and then pushed to mount onto the third bar 112 or the pickup truck 102 can be driven such that the third bar 112 is inserted into the reel 200 and the reel 200 is mounted onto the third bar 112, which can include telescoping the third bar 112. The second bar 110 can be pivoted from the loading position to the transport position, as shown in FIG. 3, which can be done in a manual or motorized manner, as disclosed herein, which can include lateral position adjustments, as disclosed herein. The second bar 110 can be locked or otherwise configured in the transport position with the reel 200 mounted onto the third bar 112 such that the second bar 110 is unable to pivot from the transport position to the loading position, especially when the pickup truck 102 is moving, whether frontward or rearward, with the reel 200 mounted onto the third bar 112. Note that the reel 200 can be removed from the third bar 112, as the second bar 110 is in the transport position, by reversing this process.

Figure 5:
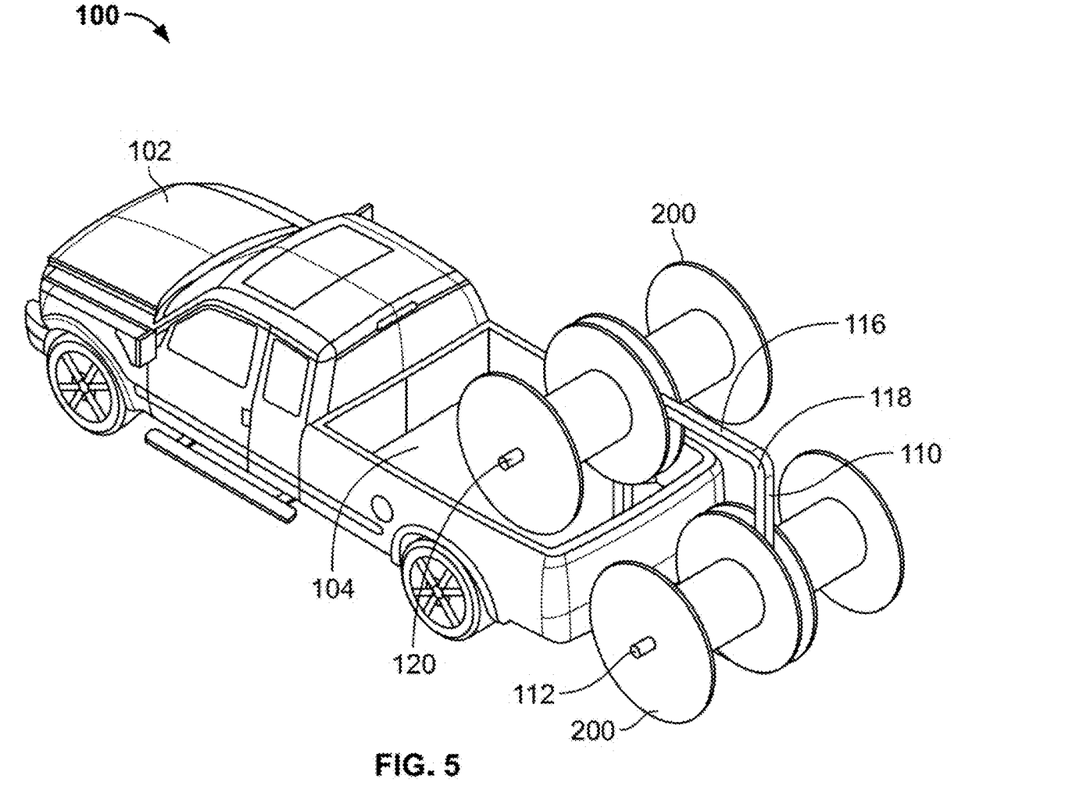
FIG. 5 shows a schematic perspective view of another embodiment of a vehicle with a reel carrier in a transport mode according to this disclosure.
Figure 8:
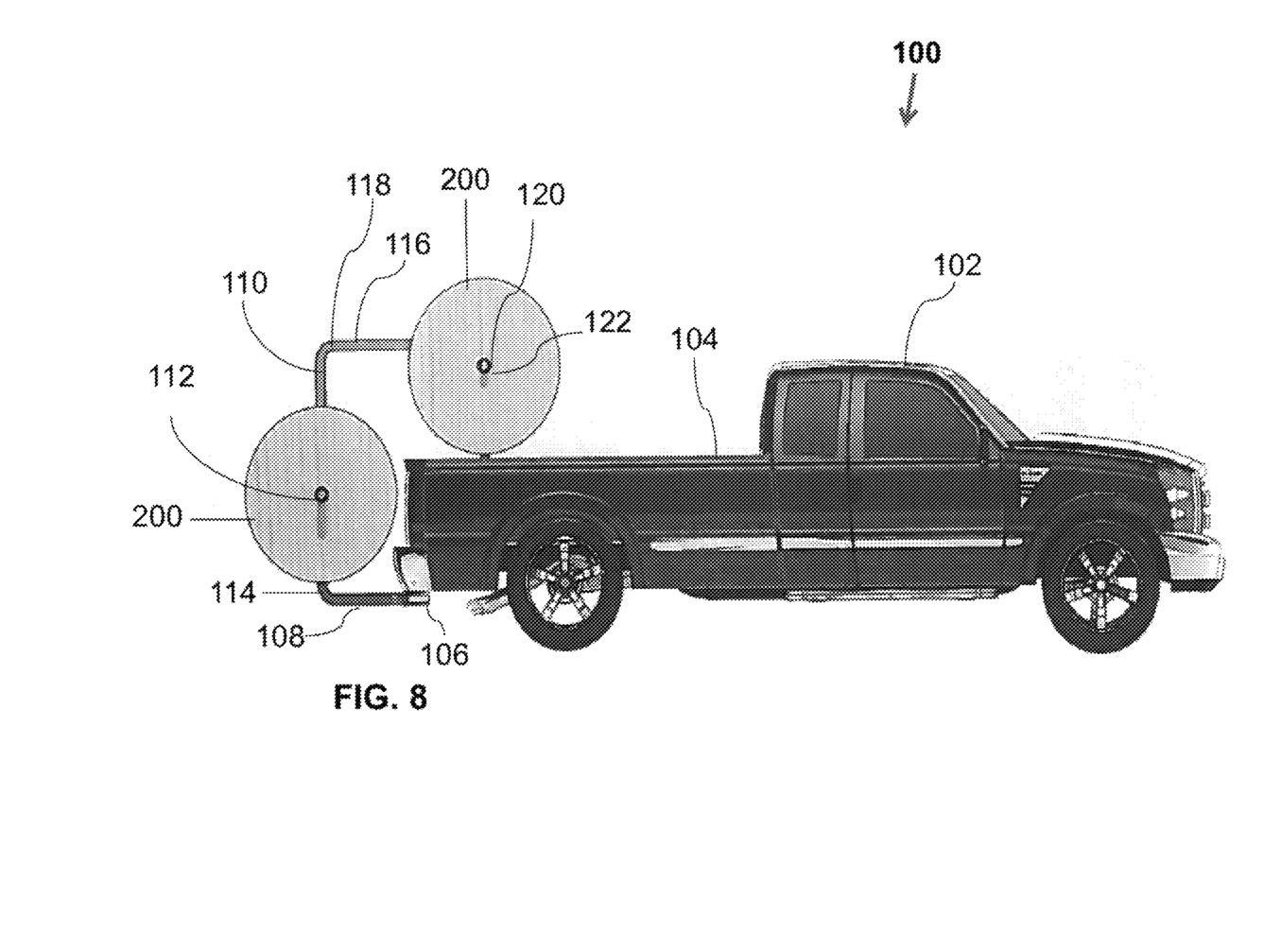
FIG. 8 shows a schematic profile view of another embodiment of a vehicle with a reel carrier in a transport mode hosting a reel according to this disclosure.

FIG. 5 shows a schematic perspective view of another embodiment of a vehicle with a reel carrier in a transport mode according to this disclosure. FIG. 8 shows a schematic profile view of another embodiment of a vehicle with a reel carrier in a transport mode hosting a reel according to this disclosure. In particular, the system 100 further includes a fourth bar 116, a hinge 118, a fifth bar 122, and a sixth bar 120.

The fourth bar 116 is coupled to the second bar 110 via the hinge 118 such that the fourth bar 116 is longitudinally cantilevered from the second bar 110 toward the cargo area 104, which can be via an extension over the cargo area 104. As shown in FIG. 5, the fourth bar 116 longitudinally cantilevers from the second bar 110 transverse to the third bar 112 and opposing the first bar 108 as the second bar 110 is in the transport position. For example, the first bar 108, the second bar 110, and the fourth bar 116 form a U-shape in the transport position. In some embodiments, the hinge 118 is lacking and the fourth bar 116 is coupled to the second bar 110, such as via fastening, mating, or others, or the fourth bar 116 and the second bar 110 are of a monolithic or unitary construction. However, when the fourth bar 116 is coupled to the second bar 110 via the hinge 118, then the fourth bar 116 is pivotable with respect to the second bar 110 via the hinge 118. The fourth bar 116 is rigid and includes metal, plastic, or others. The fourth bar 116 is solid, but can be perforated. The fourth bar 116 is longitudinally rectilinear, but can be longitudinally sinusoidal or arcuate, whether peaking downward or upward or sideways. The fourth bar 116 can pivot with respect to the second bar 110 between a transport position, such as a horizontal position shown in FIGS. 5 and 8, and a loading or unloading position, such as an inclined position such that the second bar 110 and the fourth bar 116 define a diagonal ramp. As shown in FIGS. 5 and 8, the second bar 110 and the fourth bar 116 form an L-shape in the transport position. However, note that the transport position and the loading or unloading position can be oriented differently with respect to the fourth bar 116 and the second bar 110. For example, the transport position of the fourth bar 116 can be oriented such that fourth bar 116 is upright or inclined, whether with a positive, zero, or negative slope, whether away from or towards the pickup truck 102. Likewise, for example, the loading or unloading position of the fourth bar 116 can be oriented such that the reel 200 contacts or avoids contact with the ground surface on which the pickup truck 102 rests, whether the fourth bar 116 has a negative, zero, or positive slope. In some embodiments, the fourth bar 116 can rotate sideways (portside and starboard) via the hinge 118 with respect to the second bar 110. Note that the hinge 114 and the hinge 118 can operated independently of each other or dependently on each other.

The hinge 118 can be removably or permanently secured to the fourth bar 116 or the second bar 110 via mating, fastening, or others, whether in similar or dissimilar manners. For example, the hinge 118 can be detachable from the fourth bar 116 and the second bar 110. The hinge 116 can be configured to enable a free rotation or a biased rotation, whether away or towards the pickup truck 102 or sideways (portside and starboard). The hinge 116 can be configured for positional locking via at least one of a pin, a hook, a ratchet, a bolt, or others such that the fourth bar 116 is unable to pivot from the transport position to the loading position or vice versa, especially when the pickup truck 102 is moving, whether frontward or rearward. The hinge 116 can include metal, plastic, or others. As such, via the hinge 116, the fourth bar 116 has a range of pivoting motion at least between the transport position and the loading position, where the range of pivoting motion can be about 180 degrees or less, as shown in FIGS. 2-4.

Although the fourth bar 116 can be pivoted, whether away or towards the pickup truck 102 or sideways (portside and starboard), with respect to the second bar 1110 via the hinge 116 through a manual application of force, in some embodiments, the fourth bar 116 can be pivoted, whether away or towards the pickup truck 102 or sideways (portside and starboard), with respect to the second bar 110 via the hinge 116 through an automated application of force. For example, the automated application of force can occur via a motor or actuator. The motor or actuator can be self-powered, such as via an on-board rechargeable battery, such as a lithium battery or others. The motor or actuator can be powered via a mains power source through a power cord attached thereto. The motor or actuator can be powered via a renewable energy source, such as via a photovoltaic array or a fluid turbine, whether gas or liquid, operably coupled thereto. The motor or actuator can be powered via the pickup truck 102, such as via a power cable coupled to or running into the pickup truck 102 through or along the first bar 108, such as via being coupled to or into an in-vehicle electric socket. At least one of the fourth bar 116 or the second bar 110 can host or support the motor or actuator, such as via fastening, mating, or others. Note that this disclosure is not limited to the motor or actuator and other technologies for providing the automated application of force can be used, such as a hydraulic system, a pneumatic system, a pulley system, or others.

The fifth bar 122 extends from the fourth bar 116, which can include longitudinal cantilevering or longitudinal spanning. For example, the fifth bar 122 can longitudinally cantilever from the fourth bar 116 over the ground surface or a base floor of the cargo area 104. Likewise, the longitudinal spanning can between the fourth bar 116 and the base floor of the cargo area 106 or the first bar 108, whether via a friction, a bracket, or otherwise snug fit, such as to minimize wobbling or shaking. Similarly, the second bar 110, the fourth bar 116, and the fifth bar 122 form a U-shape in the transport position, as shown in FIGS. 5 and 8. The fifth bar 122 is permanently or removably secured to the fourth bar 116 at one end, such as via mating, fastening, or others. The fifth bar 122 is rigid and includes metal, plastic, or others. The fifth bar 122 is solid, but can be perforated. The fifth bar 122 is longitudinally rectilinear, but can be longitudinally sinusoidal or arcuate, whether peaking downward or upward or sideways.

The sixth bar 120 is transversely cantilevered from the fourth bar 116, as shown in FIG. 5, or the fifth bar 122, as shown in FIG. 8. For example, the fifth bar 122 longitudinally cantilevers from the fourth bar 116 and opposes the second bar 110 in the transport position, where the sixth bar 120 longitudinally cantilevers from the fifth bar 122 transverse to the fourth bar 118. Regardless, the sixth bar 120 and the fourth bar 116 or the fifth bar 122 can form a T-shape or an L-shape or a plus sign or a cross, whether perpendicular or non-perpendicular, whether as a single bar or a plurality of bars, such as one bar per side, depending on extension and point of view. The sixth bar 120 is rigid and includes metal, plastic, or others. The sixth bar 120 is solid, but can be perforated. The sixth bar 120 is longitudinally rectilinear, but can be longitudinally sinusoidal or arcuate, whether peaking downward or upward or sideways. The sixth bar 120 is permanently or removably secured to the fourth bar 116 or the fifth bar 122 at one end, such as via mating, fastening, or others. For example, the sixth bar 120 can be detachable from the fourth bar 116 or the fifth bar 122, although a monolithic or unitary construction is possible. The sixth bar 120 can be longitudinally adjustable, such as via telescoping away or towards the fourth bar 116 or the fifth bar 122, whether in a manual or motorized manner, such as disclosed herein. The sixth bar 120 can be stationary or movable with respect to the fourth bar 116 or the fifth bar 122, such as via pivoting away or towards the pickup truck 102 or the base of the cargo area 104, such as via a hinge coupled to the fourth bar 116 or the fifth bar 122 and the sixth bar 120, which can be positionally lockable, as disclosed herein. The sixth bar 120 is sufficiently durable to support the reel 200 mounted thereon, whether full or empty. Note that the sixth bar 120 can longitudinally extend away from the second bar 110 past the reel 200, up to the reel 200, or less than the reel 200 when the reel 200 is mounted on the sixth bar 120. Further, note that more than one reel 200 can be mounted onto the sixth bar 120.

Figure 6A:
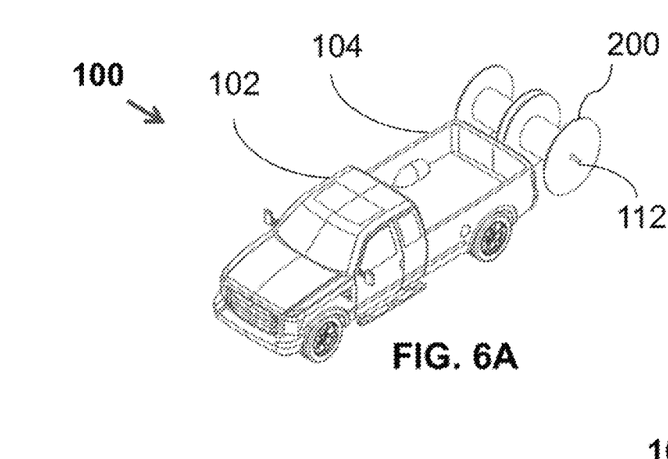
FIGS. 6A-6D show a plurality of schematic views of an embodiment of a vehicle with a reel carrier according to this disclosure.
Figure 6B:
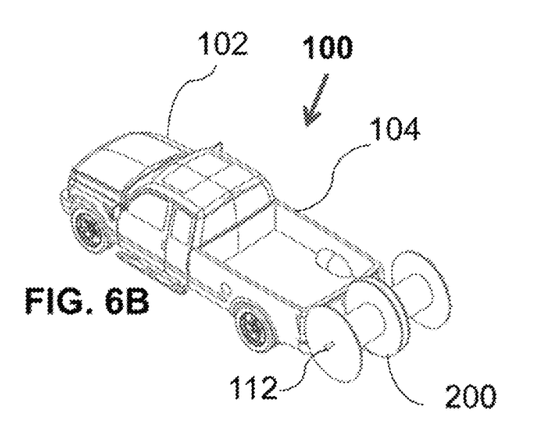
Figures 6C, 6D:
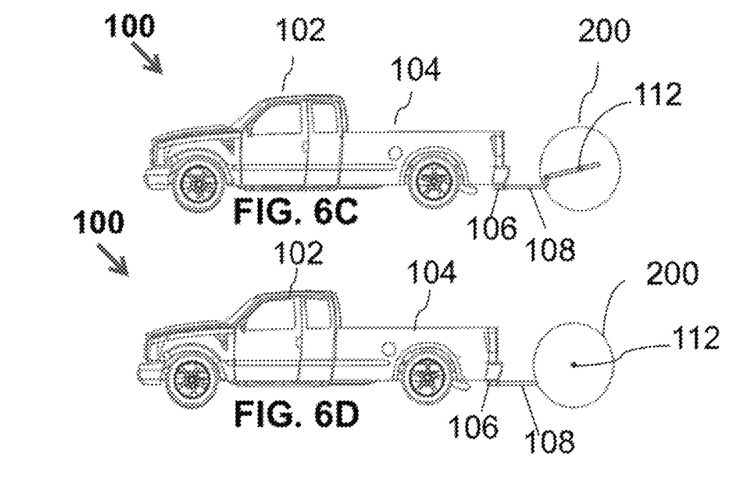

Moreover, note that the sixth bar 120 can host an arm, whether rectilinear, sinusoidal or arcuate, at an end portion thereof, distal to the fifth bar 122 or the fourth bar 116, with the arm radially extending from the sixth bar 120 in a cantilevered and sunray manner such that the arm engages the reel 200 and prevents the reel 200 from sliding off the sixth bar 120, especially when the pickup truck 102 is moving, whether frontward or rearward. The arm can be fastened, mated, or otherwise removably or permanently secured or deployed with the sixth bar 120. The arm can retract or deploy into and out of the sixth bar 120, whether in a manual or automatic manner, as disclosed herein FIGS. 6A-6D show a plurality of schematic views of an embodiment of a vehicle with a reel carrier according to this disclosure. In particular, FIGS. 6A and 6B show the second bar 110 in the transport position such that both of the reels 200 avoid contact with the ground surface on which the pickup truck 102 stands. FIGS. 6C and 6D shows the second bar 110 in the loading or unloading position such that both of the reels 200 contact the ground surface on which the pickup truck 102 stands.

Figure 7A:
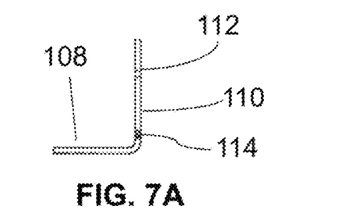
FIGS. 7A-7H show a plurality of schematic views of an embodiment of a reel carrier according to this disclosure.
Figure 7B:
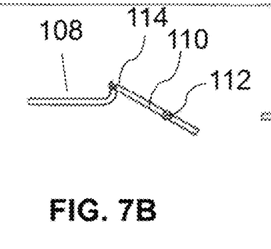
Figure 7C:
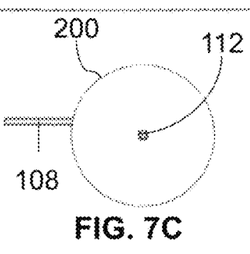
Figure 7D:
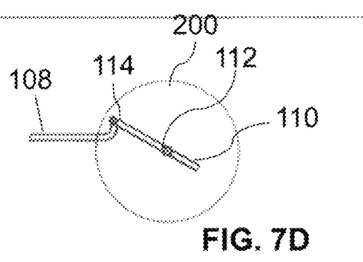
Figure 7E:
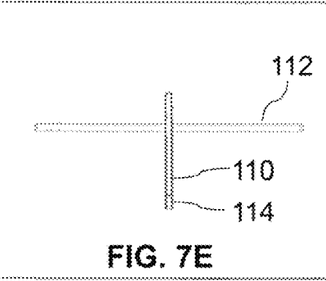
Figure 7F:
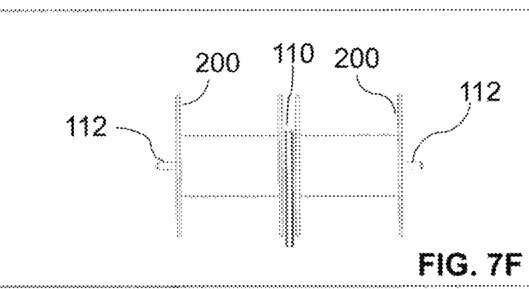
Figure 7G:
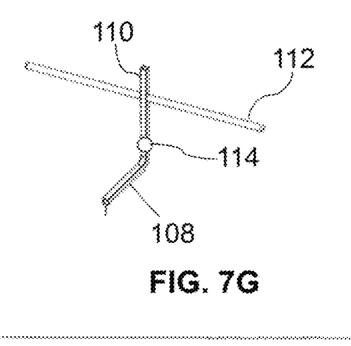
Figure 7H:
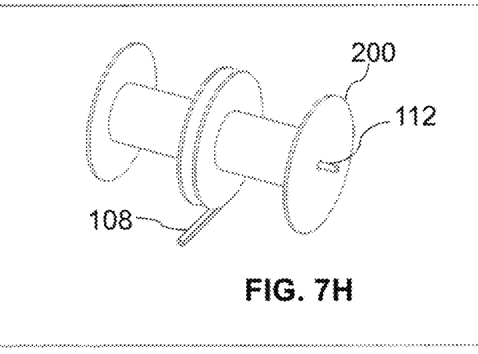

FIGS. 7A-7H show a plurality of schematic views of an embodiment of a reel carrier according to this disclosure. In particular, FIG. 7A shows the second bar 110 in the transport position. FIGS. 7B-7D show the second bar 110 in the transport position. FIGS. 7E and 7F show the second bar 110 and the third bar 112 forming a plus sign or a cross in a perpendicular manner, while the third bar 112 hosts both of the reels 200. FIGS. 7G and 7H show the first bar 108 and the second bar 110 forming an L-shape, while the second bar 110 and the third bar 112 forming a plus sign or a cross in a perpendicular manner, as the third bar 112 hosts both of the reels 200.

Resultantly, the system 100 can be used to transport two or four reels 200, although less than two reels is possible or more than four is possible depending on configuration and vehicle. For example, since the pickup truck 102 is simple to maneuver, the pickup truck 102 can be deployed closer to a desired reel spot due to the pickup truck 102 having a relatively small size and a relative maneuverability. If at least one of the reels 200 hosts an elongated element, as disclosed herein, then the elongated element can be easily pulled from the reel 200, while still mounted to the pickup truck 102 and fewer people and less time may be needed. Note that the reel 200 may be unloaded manually or through the use of powered machines, such as a motor. Note that the system 100 can be modified to cooperate with other machinery to facilitate loading, unloading, dispensing, and retracting of the reels 200 or other loads, as disclosed herein.

Features described with respect to certain example embodiments may be combined and sub-combined in or with various other example embodiments. Also, different aspects or elements of example embodiments, as disclosed herein, may be combined and sub-combined in a similar manner as well. Further, some example embodiments, whether individually or collectively, may be components of a larger system, wherein other procedures may take precedence over or otherwise modify their application. Additionally, a number of steps may be required before, after, or concurrently with example embodiments, as disclosed herein. Note that any or all methods or processes, at least as disclosed herein, can be at least partially performed via at least one entity in any manner.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Although the terms first, second, etc. can be used herein to describe various elements, components, regions, layers or sections, these elements, components, regions, layers or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing particular example embodiments and is not intended to be necessarily limiting of this disclosure. As used herein, various singular forms "a," "an" and "the" are intended to include various plural forms as well, unless a context clearly indicates otherwise. Various terms "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Example embodiments of this disclosure are described herein with reference to illustrations of idealized embodiments (and intermediate structures) of this disclosure. As such, variations from various illustrated shapes as a result, for example, of manufacturing techniques or tolerances, are to be expected. Thus, various example embodiments of this disclosure should not be construed as necessarily limited to various particular shapes of regions illustrated herein, but are to include deviations in shapes that result, for example, from manufacturing.

Any or all elements, as disclosed herein, can be formed from a same, structurally continuous piece, such as being unitary, or be separately manufactured or connected, such as being an assembly or modules. Any or all elements, as disclosed herein, can be manufactured via any manufacturing processes, whether additive manufacturing, subtractive manufacturing, or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Any or all elements, as disclosed herein, can be or include, whether partially or fully, a solid, including a metal, a mineral, an amorphous material, a ceramic, a glass ceramic, an organic solid, such as wood or a polymer, such as rubber, a composite material, a semiconductor, a nanomaterial, a biomaterial, or any combinations thereof. Any or all elements, as disclosed herein, can be or include, whether partially or fully, a coating, including an informational coating, such as ink, an adhesive coating, a melt-adhesive coating, such as vacuum seal or heat seal, a release coating, such as tape liner, a low surface energy coating, an optical coating, such as for tint, color, hue, saturation, tone, shade, transparency, translucency, opaqueness, luminescence, reflection, phosphorescence, anti-reflection, or holography, a photo-sensitive coating, an electronic, or thermal property coating, such as for passivity, insulation, resistance or conduction, a magnetic coating, a water-resistant, or waterproof coating, a scent coating, or any combinations thereof. Any or all elements, as disclosed herein, can be rigid, flexible, or any other combinations thereof. Any or all elements, as disclosed herein, can be identical or different from each other in material, shape, size, color, or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized or overly formal sense unless expressly so defined herein.

Furthermore, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" or "substantially" refers to a +/−10% variation from a nominal value/term. Such variation is always included in any given value/term provided herein, whether or not such variation is specifically referred thereto.

In some embodiments, various functions or acts can take place at a given location and/or in connection with the operation of one or more apparatuses or systems. In some embodiments, a portion of a given function or act can be performed at a first device or location, and a remainder of the function or act can be performed at one or more additional devices or locations.

Various corresponding structures, materials, acts, and equivalents of all means or step plus function elements in various claims below are intended to include any structure, material, or act for performing the function in combination with other claimed elements as specifically claimed. Various embodiments were chosen and described in order to best explain various principles of this disclosure and various practical applications thereof, and to enable others of ordinary skill in a pertinent art to understand this disclosure for various embodiments with various modifications as are suited to a particular use contemplated.

Various diagrams depicted herein are illustrative. There can be many variations to such diagrams or steps (or operations) described therein without departing from various spirits of this disclosure. For instance, various steps can be performed in a differing order or steps can be added, deleted or modified. All of these variations are considered a part of this disclosure. People skilled in an art to which this disclosure relates, both now and in future, can make various improvements and enhancements which fall within various scopes of various claims which follow.

This detailed description has been presented for various purposes of illustration and description, but is not intended to be fully exhaustive and/or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

What is claimed is:

1. A method comprising:
   accessing a frame including a first bar, a second bar, and a third bar, wherein the first bar is longitudinally cantilevered from a hitch, wherein the second bar is longitudinally cantilevered from the first bar such that the second bar is pivotable with respect to the first bar between a transport position and a loading position, wherein the third bar is transversely cantilevered from the second bar, wherein the second bar is sloped negatively relative to the first bar in the loading position;

mounting a reel onto the third bar as the second bar is in the loading position;

pivoting the second bar from the loading position to the transport position; and locking the second bar in the transport position such that the second bar is unable to pivot from the transport position to the loading position.

2. The method of claim 1, wherein the first bar and the second bar form an L-shape in the transport position.

3. The method of claim 2, wherein the second bar and the third bar form a T-shape.

4. The method of claim 1, wherein the second bar is pivoted from the loading position to the transport position via a manual application of force.

5. The method of claim 1, wherein the second bar is pivoted from the loading position to the transport position via an automated application of force.

6. The method of claim 1, wherein the first bar includes an end portion distal to the hitch, wherein the end portion includes a hook portion distal to the hitch, wherein the second bar is longitudinally cantilevered from the hook portion.

7. The method of claim 1, wherein the third bar forms a cross with the second bar.

8. The method of claim 1, wherein the frame includes a fourth bar longitudinally cantilevering from the second bar transverse to the third bar and opposing the first bar when the second bar is in the transport position.

9. The method of claim 8, wherein the first bar, the second bar, and the fourth bar form a U-shape in the transport position.

10. The method of claim 8, wherein the frame includes a fifth bar and a sixth bar, wherein the fifth bar longitudinally cantilevers from the fourth bar and opposes the second bar in the transport position, wherein the sixth bar longitudinally cantilevers from the fifth bar transverse to the fourth bar.

11. The method of claim 10, wherein the second bar, the fourth bar and the fifth bar form a U-shape in the transport position.

12. The method of claim 1, wherein the third bar is detachable from the second bar.

13. The method of claim 1, wherein the third bar extends away from the second bar past the reel.

14. The method of claim 1, wherein the second bar is locked in the transport position via at least one of a pin, a hook, a ratchet, or a bolt.

15. The method of claim 1, wherein the second bar has a range of pivoting motion between the transport position and the loading position, wherein the range of pivoting motion is about 180 degrees or less during the pivoting.

16. A method comprising:
accessing a frame including a first bar, a second bar, and a third bar, wherein the first bar is longitudinally cantilevered from a hitch, wherein the second bar is longitudinally cantilevered from the first bar such that the second bar is pivotable with respect to the first bar between a transport position and a loading position, wherein the third bar is transversely cantilevered from the second bar, wherein the third bar hosts a reel mounted thereon as the second bar is in the transport position, wherein the second bar is sloped negatively relative to the first bar in the loading position;

unlocking the second bar in the transport position as the third bar hosts the reel such that the second bar is able to pivot from the transport position to the loading position;

pivoting the second bar from the transport position to the loading position as the third bar hosts the reel; and removing the reel from the third bar as the second bar is in the loading position.

17. The method of claim 16, wherein the first bar and the second bar form an L-shape in the transport position, wherein the second bar and the third bar form a T-shape, wherein the second bar has a range of pivoting motion between the transport position and the loading position, wherein the range of pivoting motion is about 180 degrees or less during the pivoting.

18. The method of claim 16, wherein the third bar forms a cross with the second bar.

19. The method of claim 16, wherein the reel is a first reel, wherein the frame includes a fourth bar, a fifth bar, and a sixth bar, wherein the fourth bar longitudinally cantilevers from the second bar transverse to the third bar and opposes the first bar in the transport position, wherein the fifth bar longitudinally cantilevers from the fourth bar and opposes the second bar in the transport position, wherein the sixth bar longitudinally cantilevers from the fifth bar transverse to the fourth bar, wherein the sixth bar hosts a second reel thereon.

20. The method of claim 16, wherein the third bar is detachable from the second bar.

21. The method of claim 16, wherein the first bar includes an end portion distal to the hitch, wherein the end portion includes a hook portion distal to the hitch, wherein the second bar is longitudinally cantilevered from the hook portion.

22. A device comprising:
a frame including a first bar, a second bar, and a third bar, wherein the first bar is configured to longitudinally cantilever from a hitch, wherein the second bar is longitudinally cantilevered from the first bar such that the second bar is configured to pivot with respect to the first bar between a transport position and a loading position, wherein the second bar is configured to lock in the transport position such that the second bar is unable to pivot from the transport position to the loading position, wherein the third bar is transversely cantilevered from the second bar, wherein the second bar is sloped negatively relative to the first bar in the loading position, wherein the third bar being configured to have a reel mounted thereon in the transport position such that the third bar extends through the reel and the third bar being configured to have the reel removed therefrom in the loading position such that the third bar does not extend through the reel.

23. The device of claim 22, wherein the first bar and the second bar form an L-shape in the transport position.

24. The device of claim 22, wherein the first bar includes an end portion configured to be distal to the hitch, wherein the end portion includes a hook portion configured to be distal to the hitch, wherein the second bar is longitudinally cantilevered from the hook portion.

25. The device of claim 22, wherein the second bar is configured to pivot via a manual application of force.

26. The device of claim 22, wherein the second bar is configure to pivot via an automated application of force.

27. The device of claim 26, wherein the automated application of force is at least one of motorized or actuated.

28. The device of claim 22, wherein the frame includes a fourth bar longitudinally cantilevering from the second bar transverse to the third bar and opposing the first bar when the second bar is in the transport position.

29. The device of claim 28, wherein the first bar, the second bar, and the fourth bar form a U-shape in the transport position.

30. The device of claim 28, wherein the frame includes a fifth bar and a sixth bar, wherein the fifth bar longitudinally cantilevers from the fourth bar and opposes the second bar in the transport position, wherein the sixth bar longitudinally cantilevers from the fifth bar transverse to the fourth bar.

31. The device of claim 30, wherein the second bar, the fourth bar and the fifth bar form a U-shape in the transport position.

32. The device of claim 22, wherein the second bar is locked in the transport position via at least one of a hook, a ratchet, or a bolt.

33. The device of claim 22, wherein the second bar has a range of pivoting motion between the transport position and the loading position, wherein the range of pivoting motion is about 180 degrees or less during the pivoting.

34. A device comprising:
a frame including a first bar, a second bar, and a third bar, wherein the first bar is configured to longitudinally cantilever from a hitch, wherein the second bar is longitudinally cantilevered from the first bar such that the second bar is configured to pivot with respect to the first bar between a transport position and a loading position, wherein the second bar is configured to lock in the transport position such that the second bar is unable to pivot from the transport position to the loading position, wherein the third bar is transversely cantilevered from the second bar, wherein the first bar includes an end portion configured to be distal to the hitch, wherein the end portion includes a hook portion configured to be distal to the hitch, wherein the second bar is longitudinally cantilevered from the hook portion, wherein the third bar being configured to have a reel mounted thereon in the transport position such that the third bar extends through the reel and the third bar being configured to have the reel removed therefrom in the loading position such that the third bar does not extend through the reel.

35. The device of claim 34, wherein the first bar and the second bar form an L-shape in the transport position.

36. The device of claim 34, wherein the second bar is configured to pivot via a manual application of force.

37. The device of claim 34, wherein the second bar is configure to pivot via an automated application of force.

38. The device of claim 37, wherein the automated application of force is at least one of motorized or actuated.

39. The device of claim 34, wherein the frame includes a fourth bar longitudinally cantilevering from the second bar transverse to the third bar and opposing the first bar when the second bar is in the transport position.

40. The device of claim 39, wherein the first bar, the second bar, and the fourth bar form a U-shape in the transport position.

41. The device of claim 39, wherein the frame includes a fifth bar and a sixth bar, wherein the fifth bar longitudinally cantilevers from the fourth bar and opposes the second bar in the transport position, wherein the sixth bar longitudinally cantilevers from the fifth bar transverse to the fourth bar.

42. The device of claim 41, wherein the second bar, the fourth bar and the fifth bar form a U-shape in the transport position.

43. The device of claim 34, wherein the second bar is locked in the transport position via at least one of a hook, a ratchet, or a bolt.

44. The device of claim 34, wherein the second bar has a range of pivoting motion between the transport position and the loading position, wherein the range of pivoting motion is about 180 degrees or less during the pivoting.

45. The device of claim 34, wherein the second bar is sloped negatively relative to the first bar in the loading position.

46. The method of claim 5, wherein the automated application of force is at least one of motorized or actuated.

47. The method of claim 5, wherein the automated application of force at least one of hydraulic, pneumatic, or pulley.

48. The device of claim 26, wherein the automated application of force is at least one of hydraulic, pneumatic, or pulley.

49. The device of claim 22, wherein the second bar is configured to pivot via an automated application of force and a manual application of force.

50. The device of claim 37, wherein the automated application of force is at least one of hydraulic, pneumatic, or pulley.

51. The device of claim 34, wherein the second bar is configured to pivot via an automated application of force and a manual application of force.

* * * * *